Nov. 15, 1927.  1,649,503
E. B. BARBER
FASTENING INSERTING MACHINE
Filed Aug. 25, 1926   2 Sheets-Sheet 2

INVENTOR
ERNEST B. BARBER
BY
*M. W. McConkey*
ATTORNEY

Patented Nov. 15, 1927.

1,649,503

UNITED STATES PATENT OFFICE.

ERNEST B. BARBER, OF SOUTH BEND, INDIANA, ASSIGNOR TO BENDIX BRAKE COMPANY, OF CHICAGO, ILLINOIS, A CORPORATION OF ILLINOIS.

FASTENING-INSERTING MACHINE.

Application filed August 25, 1926. Serial No. 131,337.

This invention relates to fastening-inserting machines, and is illustrated as embodied in a machine for riveting friction lining to brake shoes.

An object of the invention is to arrange the machine to permit the simultaneous insertion of a plurality of lining rivets or other fastenings. In one desirable arrangement, there are duplicate inserting and feeding mechanisms with the respective escapements opposite the rivet sets or the like, which sets are so spaced apart as to permit the insertion between them of the web of a brake shoe having its sides projecting over said sets, so that rivets may be inserted simultaneously on opposite sides of the shoe.

An important minor feature of the invention relates to supporting one of the mechanisms in a novel bracket facing toward, and detachably supported by, a machine frame carrying the other mechanism, preferably with the two mechanisms driven by common shafts supported at their ends by the bracket and by the machine frame.

Another feature of the invention relates to a novel replaceable rivet set suitable for the hard usage received in attaching brake lining, and sliding in a bushing engaged at its lower end by a head on the rivet set, the set resting on a novel spring-supported plunger holding it against the bushing, thus permitting ready replacement of the rivet set. The plunger and its support may be cut away to provide clearance for the web of a brake shoe having its side projecting over the rivet set, and the plunger is preferably keyed to prevent turning movement.

Figure 1:
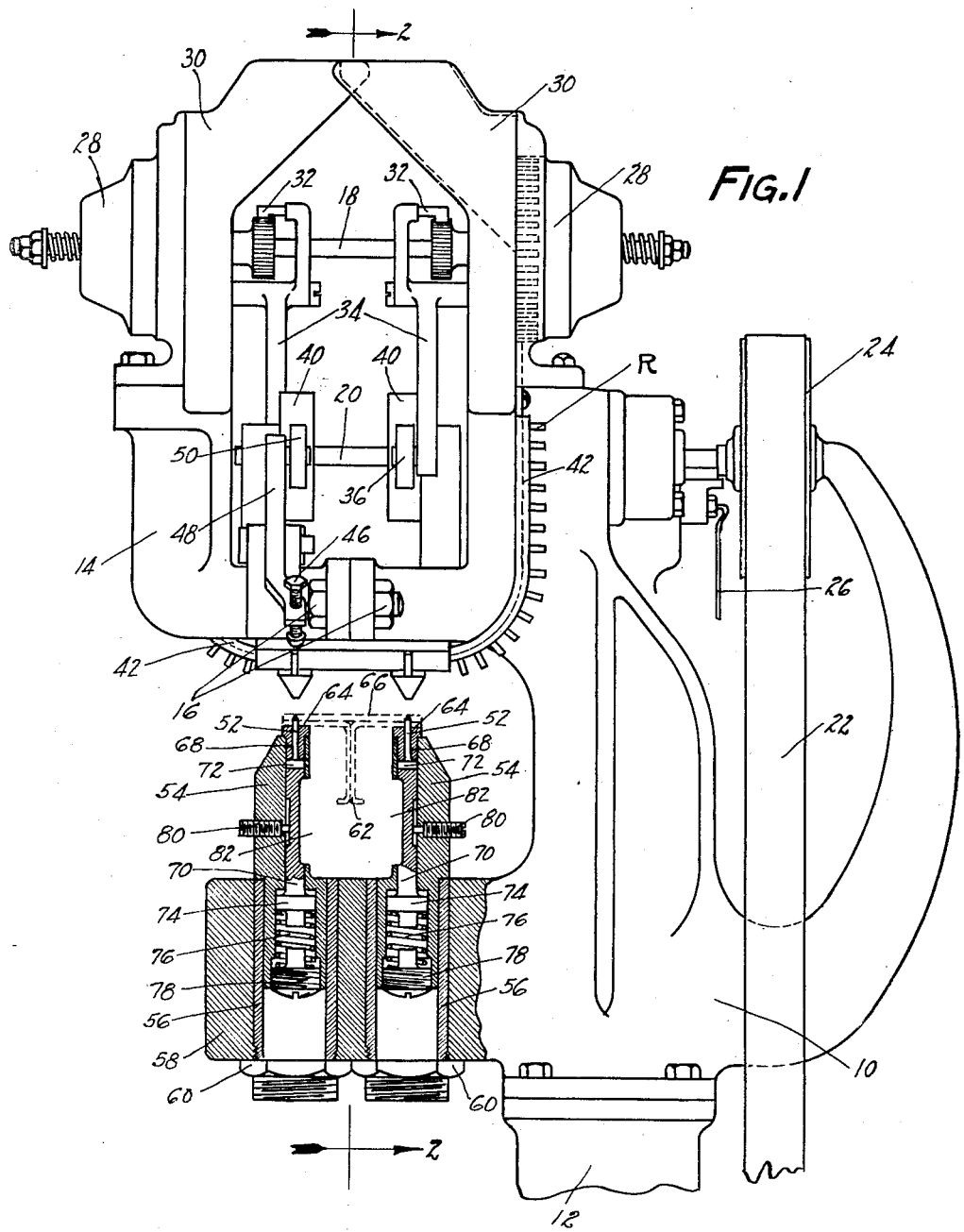
Figure 2:
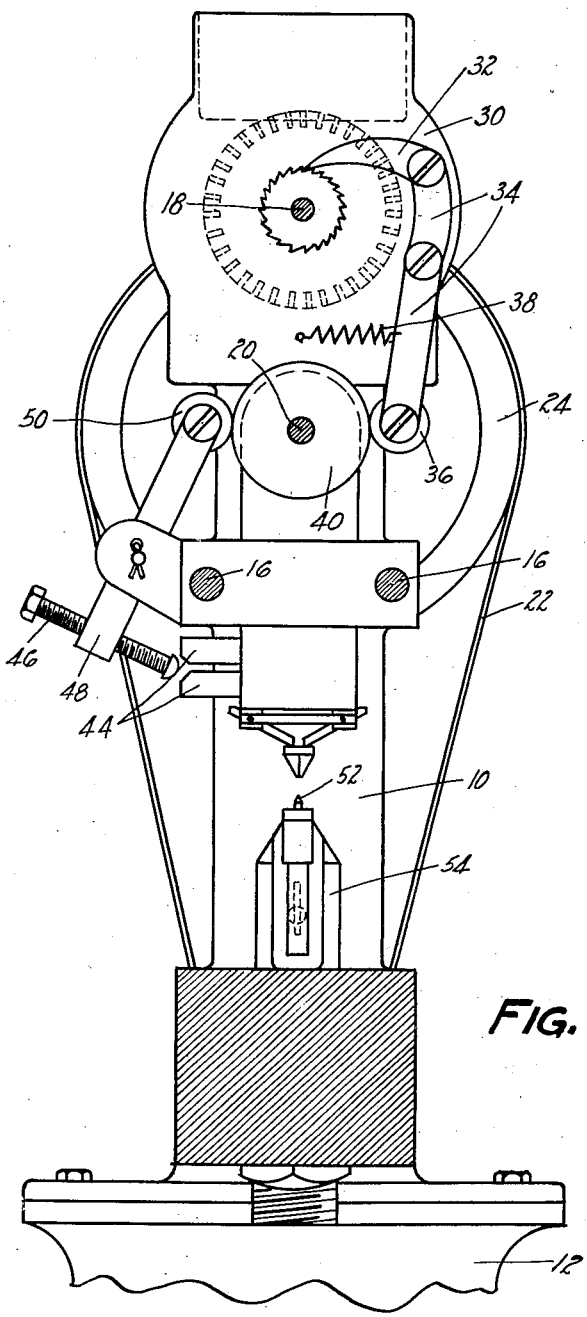

The above and other objects and features of the invention, including various novel combinations of parts and desirable particular constructions, will be apparent from the following description of one illustrative embodiment shown in the accompanying drawings, in which:

Figure 1 is a side elevation of the upper part of the machine, with the supporting means for the rivet sets broken away and shown in central vertical section; and Figure 2 is a vertical section through the machine on the line 2—2 of Figure 1.

The machine selected for illustration includes a suitable machine frame 10, mounted on a base 12 of any desired character, and supporting at its upper end one of two duplicate sets of fastening-inserting mechanism. The other set of mechanism is carried by a novel bracket 14, facing toward the frame 10 and detachably secured thereto by means such as bolts 16. Preferably the two mechanisms are driven by common shafts 18 and 20, supported at their ends by frame 10 and by bracket 14.

Shaft 18 may be driven from shaft 20 by gearing or the like (not shown), and shaft 20 is shown as driven from a belt 22 and pulley 24 through any suitable one-revolution clutch controlled by a connection 26 from a treadle or the like. This driving mechanism, and the fastening-inserting mechanisms per se, may be of any desired standard construction, and are therefore not illustrated in detail.

The particular fastening-inserting mechanisms illustrated include rivet hoppers 28, rotatably mounted in auxiliary brackets 30 bolted to the tops of frame 10 and bracket 14, and turned by pawls 32 on levers 34 having cam rollers 36 held by springs 38 against cams or eccentrics 40 on shaft 20. The rivets "R" are fed from the hoppers to chutes 42, which carry the rivets to escapements 44 operated by adjustable thrust members 46 operated by levers 48 having cam rollers 50 engaging the cams 40. Any desired standard driving means may be used.

According to an important feature of the present invention, the novel rivet sets 52 are carried by spaced supports 54, which are shown seated in bushings 56 threaded into an arm 58 projecting from frame 10 and held by locknuts 60. The supports 54 are spaced far enough apart to afford clearance for the web 62 of a brake shoe having its sides 64 extending over the rivet sets 52, and to which suitable friction lining 66 is to be riveted. One type of such brake shoes is fully described in Patent No. 1,567,716, granted Bendix Brake Company on December 29, 1925, on application of Adiel Y. Dodge.

The rivet sets 52 extend through bushings 68 in the upper ends of bores formed in the supports 54, and are independently yieldingly supported by novel plungers 70 which engage heads 72 on the lower ends of the sets, and which have at their lower ends heads 74 supported by springs 76 confined between heads 74 and plugs 78 threaded in place and forming closed lower ends for the bores in supports 54. Plungers 70 are prevented from turning about their longitudinal axes by keys 80 threaded through supports 54 and projecting into vertical keyways in the plungers.

As certain parts of the brake shoes have the stiffening webs 62 bifurcated to give a considerable width, and in order to have the supports 54 as close together as possible while still affording ample clearance for the shoes, I prefer to cut away the supports 54 and the plungers 70, as shown at 82, opposite the shoe web 62.

In operation, the shoe and lining, with holes previously punched or drilled for the rivets, is fed step-by-step past the rivet sets 52, a pair of rivets being inserted at each step.

While one illustrative embodiment has been described in detail, it is not my intention to limit the scope of the invention to that particular embodiment, or otherwise than by the terms of the appended claims. If desired, the brake shoe may be carried by a suitable fixture which is automatically indexed step-by-step past the rivet sets.

I claim:

1. A fastening-inserting machine comprising, in combination, a plurality of magazines for rivets, a corresponding plurality of escapement mechanism for feeding rivets from the magazines, supports for supporting a brake shoe at the sides thereof, said supports being spaced apart so as to provide a space into which an intermediate flange on the brake shoe may be disposed, and rivet sets in said supports opposite the escapement mechanisms.

2. A fastening-inserting machine comprising, in combination, a pair of supports for the sides of a brake shoe spaced apart to permit the passage of an intermediate flange of the brake shoe between them, and rivet sets in said supports and engageable with the opposite sides of the brake shoe.

3. A fastening-inserting machine comprising, in combination, a pair of supports for the sides of a brake shoe spaced apart to permit the passage of an intermediate flange of the brake shoe between them, and independently-yielding rivet sets in said supports engageable with the opposite sides of the brake shoe.

4. A fastening-inserting machine comprising, in combination, a support having a bore closed at its lower end, a plunger in said bore having a head adjacent its lower end, a spring confined between said head and the closed lower end of the bore, a bushing in the upper end of the bore, and a rivet set having its shank in the bushing and having a head between the lower end of the bushing and the upper end of the plunger.

5. A fastening-inserting machine comprising, in combination, a support having a bore closed at its lower end, a plunger in said bore having a head adjacent its lower end, a spring confined between said head and the closed lower end of the bore, a bushing in the upper end of the bore, and a rivet set having its shank in the bushing and having a head between the lower end of the bushing and the upper end of the plunger, together with a key preventing the plunger from having any considerable turning movement about its longitudinal axis.

In testimony whereof, I have hereunto signed my name.

ERNEST B. BARBER.